United States Patent
Jiang et al.

(10) Patent No.: US 11,101,868 B2
(45) Date of Patent: Aug. 24, 2021

(54) METHOD, APPARATUS AND STORAGE DEVICE FOR PERFORMING DECORRELATION ACROSS SPATIAL LAYERS

(71) Applicant: Nokia Solutions and Networks Oy, Espoo (FI)

(72) Inventors: Wei Jiang, Zhejiang (CN); Gunter Wolff, Lauphein (DE)

(73) Assignee: Nokia Solutions and Networks Oy, Espoo (FI)

(*) Notice: Subject to any disclaimer, the term of this patent is extended or adjusted under 35 U.S.C. 154(b) by 144 days.

(21) Appl. No.: 16/301,193

(22) PCT Filed: May 12, 2016

(86) PCT No.: PCT/CN2016/081845
§ 371 (c)(1),
(2) Date: Nov. 13, 2018

(87) PCT Pub. No.: WO2017/193329
PCT Pub. Date: Nov. 16, 2017

(65) Prior Publication Data
US 2019/0296819 A1    Sep. 26, 2019

(51) Int. Cl.
*H04B 7/06* (2006.01)
*H04B 7/0456* (2017.01)
*H04L 1/06* (2006.01)

(52) U.S. Cl.
CPC ......... *H04B 7/0697* (2013.01); *H04B 7/0456* (2013.01); *H04L 1/06* (2013.01)

(58) Field of Classification Search
CPC .. H04B 7/0456; H04B 7/0465; H04B 7/0486; H04B 7/0697; H04L 1/06
(Continued)

(56) References Cited

U.S. PATENT DOCUMENTS

| 2010/0034186 A1 | 2/2010 | Zhou et al. ............ 370/344 |
| 2011/0085587 A1 | 4/2011 | Monisley et al. ........ 375/219 |

(Continued)

FOREIGN PATENT DOCUMENTS

| CN | 101297500 A | 10/2008 |
| CN | 101335599 A | 12/2008 |

(Continued)

*Primary Examiner* — Omar J Ghowrwal
*Assistant Examiner* — Kokou R Detse
(74) *Attorney, Agent, or Firm* — Harrington & Smith

(57) ABSTRACT

This document discloses a solution for improving transmission characteristics of a communication signal transmitted from a transmitter. According to an aspect, a method includes arranging, in a transmitter, information to be transmitted to a receiver, to a plurality of spatial layers where each spatial layer is associated with a unique precoding configuration amongst the plurality of spatial layers, wherein the information includes at least one signal that is identical in a plurality of the plurality of spatial layers; performing, in the transmitter, a decorrelation operation across the plurality of spatial layers such that the at least one signal in one of the plurality of spatial layers becomes decorrelated with the at least one signal in another one of the plurality of spatial layers; and causing, in the transmitter, transmission of a transmission signal including the information in the plurality of spatial layers to the receiver.

18 Claims, 4 Drawing Sheets

(58) Field of Classification Search
USPC .......................................................... 370/328
See application file for complete search history.

(56) References Cited

U.S. PATENT DOCUMENTS

| | | | |
|---|---|---|---|
| 2012/0106595 A1 | 5/2012 | Bhattad et al. | ............... 375/146 |
| 2013/0114763 A1* | 5/2013 | Park | ................... H04B 7/0469 |
| | | | 375/296 |
| 2014/0105316 A1 | 4/2014 | Yuan et al. | ................... 375/260 |
| 2018/0054275 A1* | 2/2018 | Kimura | ................. H04L 1/0041 |

FOREIGN PATENT DOCUMENTS

| | | | | |
|---|---|---|---|---|
| WO | WO2012/076320 A1 | 6/2012 | | |
| WO | WO-2012076320 A1 * | 6/2012 | ....... | H04L 25/03006 |

\* cited by examiner

METHOD, APPARATUS AND STORAGE DEVICE FOR PERFORMING DECORRELATION ACROSS SPATIAL LAYERS

This patent application is a U.S. National Stage application of International Patent Application Number PCT/CN2016/081845 filed May 12, 2016, which is hereby incorporated by reference in its entirety.

TECHNICAL FIELD

The invention relates to wireless communication systems and, in particular, to a solution for performing transmission signal processing in connection with spatial multiplexing multiple-input-multiple-output (MIMO) communications.

BACKGROUND

Many wireless communication systems employ multiple antennas in transmission and reception. Such an antenna configuration enables multiple-input-multiple-output (MIMO) communications and, in some situations, use of spatial multiplexing. In the spatial multiplexing, a plurality of (orthogonal) spatial communication channels are available between a transmitter and a receiver. The presence of the spatial channels may be caused by multi-path radio propagation where different propagation paths are mutually uncorrelated. The spatial channels may be called spatial layers in some pieces of literature.

BRIEF DESCRIPTION

The invention is defined by the subject matter of the independent claims. Some embodiments are defined in the dependent claims.

BRIEF DESCRIPTION OF THE DRAWINGS

In the following the invention will be described in greater detail by means of preferred embodiments with reference to the accompanying drawings, in which.

DETAILED DESCRIPTION OF EMBODIMENTS

Figure 1:
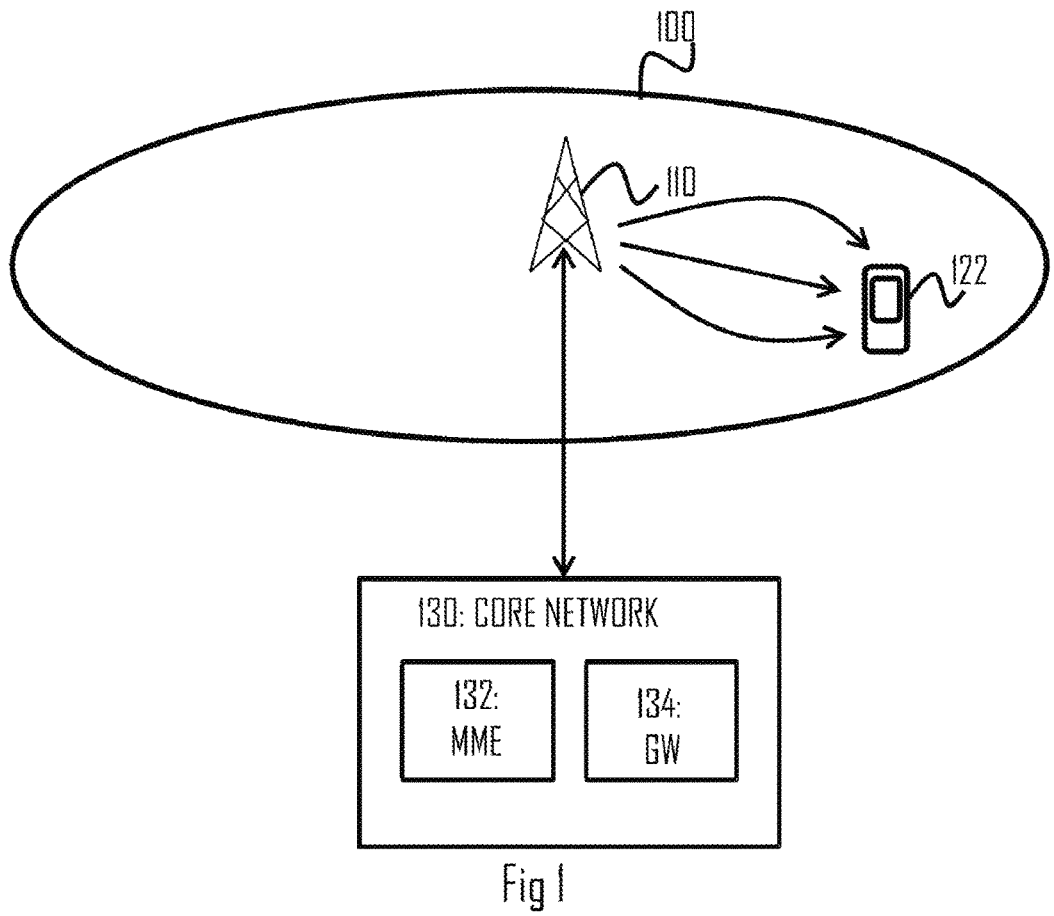
FIG. 1 illustrates a wireless communication scenario to which some embodiments of the invention may be applied.

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments. Embodiments described may be implemented in a radio system, such as in at least one of the following: Universal Mobile Telecommunication System (UMTS, 3G) based on basic wideband-code division multiple access (W-CDMA), high-speed packet access (HSPA), Long Term Evolution (LTE), LTE-Advanced, and/or 5G system.

The embodiments are not, however, restricted to the system given as an example but a person skilled in the art may apply the solution to other communication systems provided with necessary properties. One example of a suitable communications system is the 5G system, as listed above. 5G has been envisaged to use multiple-input-multiple-output (MIMO) multi-antenna transmission techniques, many more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology (RAT), each optimized for certain use cases and/or spectrum. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

FIG. 1 illustrates an example of a communication system to which some embodiments of the invention may be applied. The system may comprise at least one access node 110 providing and managing a cell 100. The cell may be, e.g., a macro cell, a micro cell, femto, or a pico cell, for example. From another point of view, the cell may define a coverage area or a service area of the access node 110.

The access node 110 may be an evolved Node B (eNB) as in the LTE and LTE-A, an access point of an IEEE 802.11-based network (Wi-Fi™ or wireless local area net-work, WLAN), or any other apparatus capable of controlling radio communication and managing radio resources within a cell. For 5G solutions, the implementation may be similar to LTE-A, as described above. The access node 110 may be called a base station or a network node. The system may be a cellular communication system composed of a radio access network of access nodes, each controlling a respective cell or cells. The access nodes may provide terminal devices 122 with wireless access to other networks such as the Internet. In some scenarios, one or more local area access nodes may be arranged within a control area of a macro cell access node. The local area access node may provide wireless access within a sub-cell that may be comprised within a macro cell. Examples of the sub-cell may include a micro, pico and/or femto cell. Typically, the sub-cell provides a hot spot within the macro cell. The operation of the local area access node may be controlled by an access node under whose control area the sub-cell is provided.

In the case of multiple access nodes in the communication network, the access nodes may be connected to each other with an interface. LTE specifications call such an interface as X2 or S1 interface. In IEEE 802.11 networks, a similar interface is provided between access points. Other communication methods between the access nodes may also be possible. The access nodes may be further connected via another interface to a core network 130 of the cellular communication system. The LTE specifications specify the core network as an evolved packet core (EPC), and the core network may comprise a mobility management entity (MME) 132 and a gateway (GW) node 134. The MME may handle mobility of terminal devices in a tracking area encompassing a plurality of cells and also handle signalling connections between the terminal devices and the core network 130. The gateway node 134 may handle data routing in the core network 130 and to/from the terminal devices.

The radio system of FIG. 1 may support Machine Type Communication (MTC). MTC may enable providing service for a large amount of MTC capable devices, such as the at least one terminal device 122. The at least one terminal device 120 may comprise a mobile phone, smart phone, tablet computer, laptop or other devices used for user communication with the radio communication network, such as an MTC network. These devices may provide further functionality compared to the MTC scheme, such as communication link for voice, video and/or data transfer. However, in MTC perspective the at least one terminal device 122 may be understood as a MTC device. It needs to be understood that the at least one terminal device 122 may also comprise another MTC capable device, such as a sensor device providing position, acceleration and/or temperature information to name a few examples. Some embodiments of the invention may thus be applicable to Internet of Things (IoT) systems, e.g. a radio access technology supporting a narrowband IoT (NB-IoT) communication scheme.

As illustrated in FIG. 1 with the multiple arrows representing downlink transmission from the access node 110 to the terminal device 122, the downlink transmission may be carried out by using multi-antenna transmission techniques such as multiple-input-multiple-output (MIMO) communication. MIMO refers to a scenario where both the access node 110 and the terminal device 122 employ an antenna array comprising a plurality of antenna elements or antenna ports. In a typical radio channel, multipath propagation of radio signals between the access node 110 and the terminal device 122 may be exploited by generating multiple spatially distributed channels between the access node 110 and the terminal device 122. The spatial channels may be selected such that they are mutually orthogonal or substantially uncorrelated. Such spatial channels may be used for diversity transmission in which the same information is transmitted through different spatial channels, thus improving reliability of transmission. Another use case is spatial multiplexing in which different data is transmitted through different spatial channels, thus improving data rate and throughput of the communication.

Transmission power characteristics is an important topic in radio transmissions. A power amplifier is a critical component in the transmission. Power efficiency and output signal quality of the power amplifier may depend on a peak-to-average power ratio (PAPR) of an input signal of the power amplifier. It may be desired to have a low-PAPR input signal so that the power amplifier can optimally use its dynamic range and achieve the highest power efficiency. Otherwise, the power amplifier may introduce distortion or clipping to the signal, and/or the cost of the power amplifier may increase. This applies to both uplink and downlink transmission.

The inventors have discovered a feature of a MIMO transmission signal that increases the PAPR of the input signal of the power amplifier. A transmitter allocating information to be transmitted to a receiver to a plurality of spatial layers. The information may comprise a signal that is identical in multiple spatial layers or even in all spatial layers. One example of such a signal is a reference signal, e.g. a demodulation reference signal (DM-RS) that is used by a receiver to demodulate data. In some cases, the signal in the different spatial layers may be arranged in the corresponding locations such that the signal is transmitted simultaneously on the plurality of spatial layers. In other words, the power amplifier amplifies the signal of the different spatial layers simultaneously. Since the signal is identical in the different spatial layers and thus highly correlated, the power-amplifier experiences a constructive superposition of the signal which increases the peak amplitude of the input signal and the PAPR.

The spatial layer may correspond to its definition in LTE specifications of the $3^{rd}$ Generation Partnership Project (3GPP). The spatial layer may be associated with a spatial channel described above in connection with FIG. 1. In some literature, the spatial channel is defined as a MIMO sub-channel.

Figure 2:
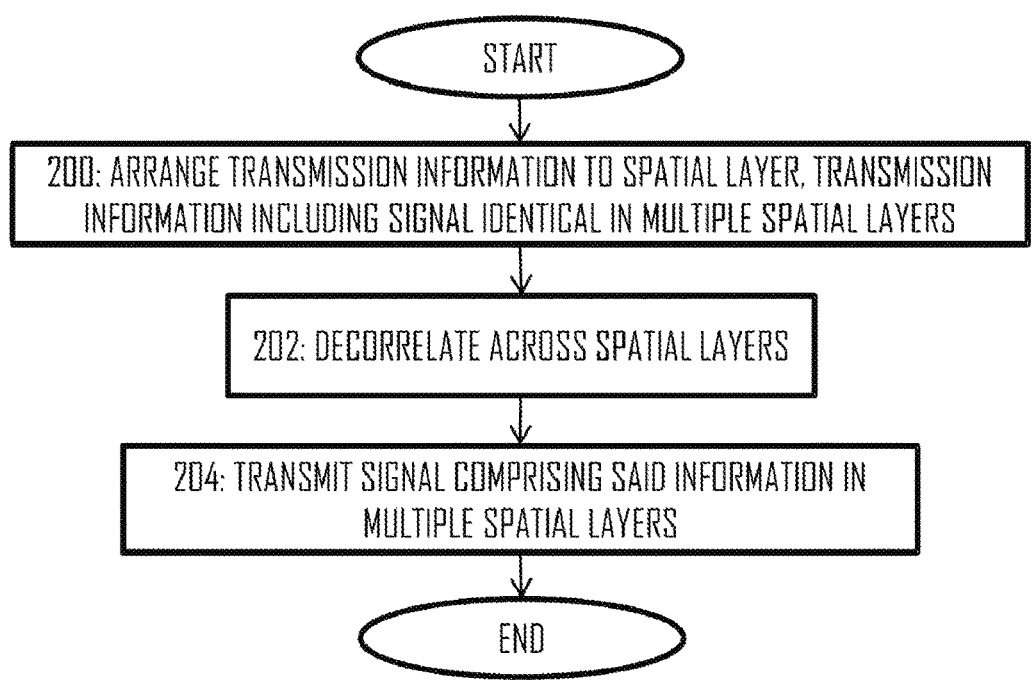
FIG. 2 illustrates a flow diagram of an embodiment for improving transmission properties of a radio transmitter.

FIG. 2 illustrates an embodiment of a process for reducing the PAPR in the transmitter such as the access node 110. Referring to FIG. 2, the process comprises: arranging (block 200) information to be transmitted to a receiver such as a terminal device to a plurality of spatial layers where each spatial layer is associated with a unique precoding configuration amongst the plurality of spatial layers, wherein the information comprises at least one signal that is identical in a plurality of the plurality of spatial layers; performing (block 202) a decorrelation operation across the plurality of spatial layers such that the at least one signal in one of the plurality of spatial layers becomes decorrelated with the at least one signal in another one of the plurality of spatial layers; and causing (block 204) transmission of a transmission signal comprising the information in the plurality of spatial layers to the receiver.

The decorrelation of the signal that is identical in the different spatial layers may effectively prevent the constructive superposition in the power amplifier and, as a consequence, may reduce the PAPR and improve the efficiency of the power amplifier.

The transmission signal may be a multicarrier signal. The transmission signal may be an aggregate signal comprising the signals in the different spatial layers.

From the viewpoint of a receiver communicating with the transmitter, let us describe a process for receiving the transmission signal propagated through a radio channel. The receiver may be a terminal device in communication with an access node, e.g. the terminal device 122. The process may comprise receiving, in the receiver from a transmitter, a communication signal comprising information in a plurality of spatial layers where the information has been arranged to the plurality of spatial layers in the transmitter such that each spatial layer is associated with a precoding configuration that is unique amongst the plurality of spatial layers, wherein the information comprises at least one signal that is identical in a plurality of the plurality of spatial layers and where a decorrelation operation has been performed in the transmitter across the plurality of spatial layers such that the at least one signal in one of the plurality of spatial layers becomes decorrelated with the at least one signal in another one of the plurality of spatial layers.

In an embodiment, the transmitter is the access node and the receiver is the terminal device. In another embodiment, the transmitter is the terminal device and the receiver is the access node.

Figure 3:
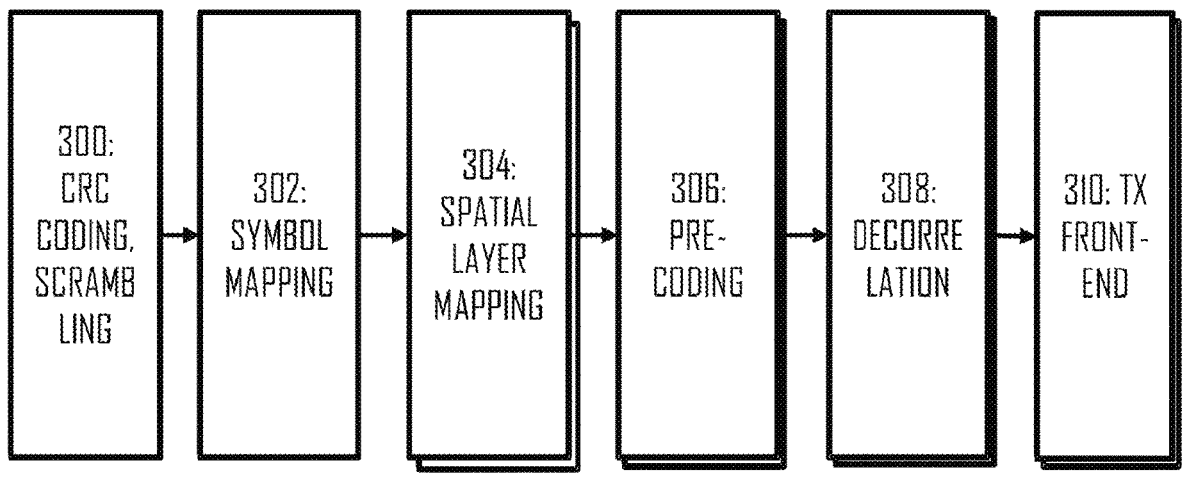
FIG. 3 illustrates a transmitter chain according to an embodiment of the invention.

FIG. 3 illustrates a transmitter chain for transmitting the information. The information may contain payload data and one or more control signals and/or reference signals. Referring to FIG. 3, the information is processed with a cyclic redundancy check (CRC) process, a channel coding process, and a scrambling process in block 300. In these processes, the information may be encoded with a specific code to improve reliability of the transmission. All of these processes of block 300 may be carried out by using state-of-the-art processes. In block 302, the information is mapped into modulation symbols according to a modulation symbol constellation currently in use. Typical modulation symbol constellations include, for example, a quadrature phase shift keying (QPSK) and quadrature amplitude modulation (QAM). As a result of the modulation, a set of data symbols and a set of control symbols may be output. In block 304, the modulation symbols output from the symbol mapping 302 are distributed into spatial layers. The number of spatial layers may be two, three four, or eight, for example. The number of spatial layers may depend on a rank of the radio channel. The rank indicates the number or uncorrelated spatial channels in the radio channel between the transmitter and the receiver. The rank may be determined on the basis of a channel estimation procedure. The transmitter may acquire the rank from the receiver in uplink control information.

In block 308, the modulation symbols after the spatial layer mapping may be pre-coded in frequency domain. The precoding may be denoted by:

$$x = W \cdot s$$

where $s = [s_1 \ldots s_L]^T$ are frequency domain symbols on L spatial layers, W is a precoding matrix of size N×L, and $x = [x_1 \ldots x_N]^T$ are frequency domain symbols on N antenna ports. T as a superscript refers to a transpose operation.

The precoding may be considered as a solution for defining beamforming configurations for the spatial layers. The beamforming refers to selection of spatial directivity of a radio beam carrying the signal in the spatial layer. The beamforming configuration is an element in directing the signal from an antenna to an appropriate spatial channel between the transmitter and the receiver.

In an LTE system with downlink closed-loop spatial multiplexing, e.g. transmission modes TM4/TM9/TM10, a terminal device selects the precoding matrix based on a codebook predefined by 3GPP specifications, and the access node performs precoding according to a precoding matrix indicator reported by the terminal device.

Before the precoding, the signals on the different spatial layers may be decorrelated with respect to each other in block 306. In another embodiment, the decorrelation is carried out together with the pre-coding as described in the following paragraph. Some embodiments described below employ phase rotation in which signals in different spatial layers are phase-rotated differently in order to provide a phase offset between two identical signals in the different spatial layers. The phase offset may prevent the constructive superposition of the two signals. After the precoding, the signals of the spatial layers may be applied to further transmitter circuitries for generation of a multi-carrier signal for each spatial layer, power amplification, etc. in block 310. The transmitter of FIG. 3 may be a multi-carrier transmitter configured to generate and transmit orthogonal frequency-division multiplexing (OFDM) signals, for example.

Some embodiments of the invention carry out a phase rotation for the signals on the spatial layers before the precoding. Other embodiments modify the precoding matrix W so that the phase rotations or other decorrelation coefficients or factors are incorporated in the precoding matrix W.

In an embodiment, the decorrelation in block 306 comprises selecting a phase ration value for at least one of the plurality of spatial layers and rotating a phase of the at least one signal in said at least one of the plurality of spatial layers according to the selected phase rotation value. By selecting and applying a different phase rotation value for two spatial layers effectively causes a phase offset between signals on the different spatial layers. As a consequence, if a signal or signal component is identical in the spatial layers, e.g. in the same time-frequency position or in the same time position in the spatial layers and, thus, causing high correlation between the spatial layers, the phase offset reduces the correlation. According to another point of view, if a signal or signal component is identical in the spatial layers over the same period of time, at the same frequency positions or different frequency positions, and thus causing high correlation between the spatial layers and/or frequency positions, the phase offset reduces the correlation.

Figure 4:
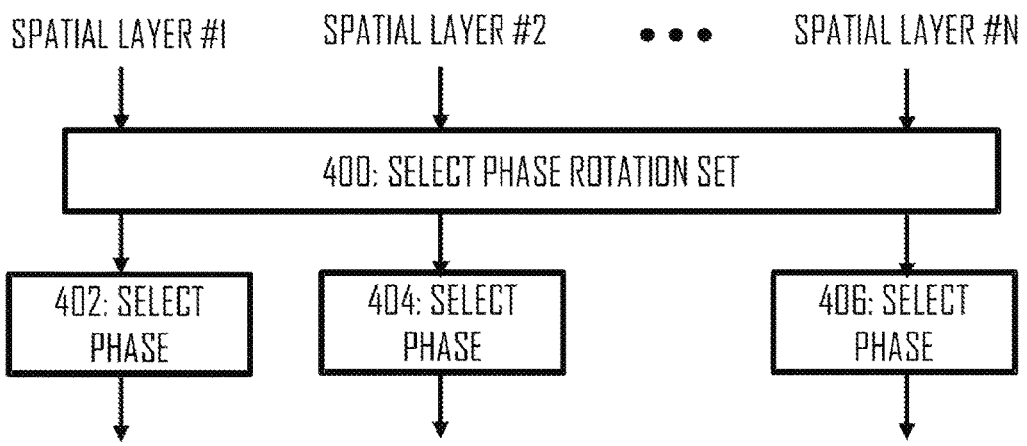
FIG. 4 illustrates an embodiment for performing decorrelation across a plurality of spatial layers.

FIG. 4 illustrates an embodiment of the phase rotation. Referring to FIG. 4, a phase rotation set comprising a plurality of phase rotation values is selected collectively for the spatial layer 1 to L in the block 400. In some embodiments, the phase rotation set may be defined as a phase rotation matrix R. The phase rotation matrix may be a diagonal matrix. When L=4, the phase rotation matrix may be denoted by:

$$R = \begin{bmatrix} e^{j\varphi_1} & 0 & 0 & 0 \\ 0 & e^{j\varphi_2} & 0 & 0 \\ 0 & 0 & e^{j\varphi_3} & 0 \\ 0 & 0 & 0 & e^{j\varphi_4} \end{bmatrix}$$

When L=8, the phase rotation matrix may be denoted by:

$$R = \begin{bmatrix} e^{j\varphi_1} & 0 & 0 & 0 & 0 & 0 & 0 & 0 \\ 0 & e^{j\varphi_2} & 0 & 0 & 0 & 0 & 0 & 0 \\ 0 & 0 & e^{j\varphi_3} & 0 & 0 & 0 & 0 & 0 \\ 0 & 0 & 0 & e^{j\varphi_4} & 0 & 0 & 0 & 0 \\ 0 & 0 & 0 & 0 & e^{j\varphi_5} & 0 & 0 & 0 \\ 0 & 0 & 0 & 0 & 0 & e^{j\varphi_6} & 0 & 0 \\ 0 & 0 & 0 & 0 & 0 & 0 & e^{j\varphi_7} & 0 \\ 0 & 0 & 0 & 0 & 0 & 0 & 0 & e^{j\varphi_8} \end{bmatrix}$$

$\varphi_1$ to $\varphi_8$ denote the phase rotation values on the corresponding spatial layers. In blocks 402, 404, 406, the signal in each spatial layer is processed with the phase rotation value associated with the spatial layer in the phase rotation set. For example, a signal in the first spatial layer #1 may be rotated with the phase rotation values $\varphi_1$, a signal in the second spatial layer #2 may be rotated with the phase rotation values $\varphi 2$, and so on for each spatial layer.

When represented mathematically, the precoding and the phase rotation may be combined such that the precoding matrix W may be multiplied with the phase rotation matrix R so that the transmitter may carry out the precoding of the information to be transmitted with a modified precoding matrix W' denoted by:

$$W' = W \times R$$

For the example of L=4, the precoding matrix W may have the following form:

$$W = [w_1 w_2 w_3 w_4],$$

and the modified precoding matrix may have the following form:

$$W' = [w'_1 w'_2 w'_3 w'_4],$$

where $w'_1$ is a first precoding vector associated with a first one of the plurality of spatial layers, multiplied by a first phase rotating vector, $w'_2$ is a second precoding vector associated with a second one of the plurality of spatial layers, multiplied by a second phase rotating vector, $w'_3$ is a third precoding vector associated with a third one of the plurality of spatial layers, multiplied by a third phase rotating vector, and $w'_4$ is a fourth precoding vector associated with a fourth one of the plurality of spatial layers, multiplied by a fourth phase rotating vector.

In an embodiment, the phase rotation values of a phase rotation set may be selected and preconfigured such that a condition defined by the following equation is satisfied:

$$\frac{w'_1}{w'_2} = -\frac{w'_3}{w'_4}$$

The division $$\frac{a}{b}$$

may be considered as element-wise division of vector a by vector b. This principle behind this equation may relate to the manner in which the spatial layers are mapped to resource blocks or groups of sub-carriers. The equation results from the LTE specification where spatial layers with indices 1 and 2 are transmitted in the same group of sub-carriers, and spatial layers with indices 3 and 4 are transmitted in the same group of sub-carriers. This may be generalized such that the condition defines, on one side of the equation, a ratio between two precoding vectors associated with spatial layers allocated to use a first group of sub-carriers and, on the other side of the equation, a ratio between two precoding vectors associated with spatial layers allocated to use a second group of sub-carriers. The first and second group may define mutually different sub-carrier groups. Some examples of phase rotation sets that satisfy this condition when the precoding matrix satisfies a condition $$\frac{w_1}{w_2} = \frac{w_3}{w_4}$$

include:

$\varphi_1=0$, $\varphi_2=0$, $\varphi_3=0$, $\varphi_4=\pi$ $\varphi_1=\pi$, $\varphi_2=0$, $\varphi_3=0$, $\varphi_4=0$ $\varphi_1=\pi$, $\varphi_2=\pi$, $\varphi_3=0$, $\varphi 4=\pi$ In an embodiment, the phase rotation set is selected on the basis of the selected precoding configuration. Accordingly, different phase rotation sets may be selected for different phase rotation configurations, and at least one or a plurality of precoding configurations may be mapped to a phase rotation set applicable to the precoding configuration. At least one precoding configuration may be associated with disabled decorrelation. For example, the decorrelation may be disabled when the precoding matrix readily satisfies the following condition:

$$\frac{w_1}{w_2} = -\frac{w_3}{w_4}$$

In other words, the decorrelation is not necessarily applied to all precoding configurations available to the transmitter.

When L=8, the modified precoding matrix may have the following form:

$$W' = [w'_1 w'_2 w'_3 w'_4 w'_5 w'_6 w'_7 w'_8]$$

Similarly to the case of L=4, the phase rotation sets may be configured such that the following equations are satisfied:

$$\frac{w'_1}{w'_2} = -\frac{w'_3}{w'_4}, \frac{w'_5}{w'_7} = -\frac{w'_6}{w'_8}$$

Some examples for the phase rotation values for this rank-8 precoding are listed below:

$\varphi_1=0$, $\varphi_2=0$, $\varphi_3=0$, $\varphi_4=\pi$, $\varphi_5=0$, $\varphi_6=0$, $\varphi_7=0$, $\varphi_8=\pi$ $\varphi_1=\pi$, $\varphi_2=0$, $\varphi_3=0$, $\varphi_4=0$, $\varphi_5=0$, $\varphi_6=\pi$, $\varphi_7=0$, $\varphi_8=0$ $\varphi_1=\pi$, $\varphi_2=\pi$, $\varphi_3=0$, $\varphi_4=\pi$, $\varphi_5=\pi$, $\varphi_6=\pi$, $\varphi_7=0$, $\varphi_8=\pi$ As seen in the examples, the actual phase rotation may be applied to a subset of spatial layers. As becomes obvious from these examples, rotating a phase of a signal on a single spatial layer effectively causes a phase offset between the signal and signals on the other spatial layers. At least one of the plurality of spatial layers may be maintained without phase rotation, e.g. its phase rotation value may be zero.

As described above, one function of the decorrelation is to remove the constructive superposition of a signal or a signal component such as a symbol or a group of symbols) that is/are simultaneously identical in each spatial layer. Accordingly, the decorrelation may be applied at least to transmission symbols, e.g. multicarrier symbols such as OFDM symbols, that comprise such a signal. In an embodiment, the decorrelation is applied additionally to transmission symbols that do not exhibit such a problem of constructive superposition.

In an embodiment, the phase rotation set is selected amongst the available phase rotations sets randomly or pseudo-randomly. For example, any one of the above-described examples for N=4 may be selected when the rank is four. The same applies to the examples where N=8.

Figure 5:
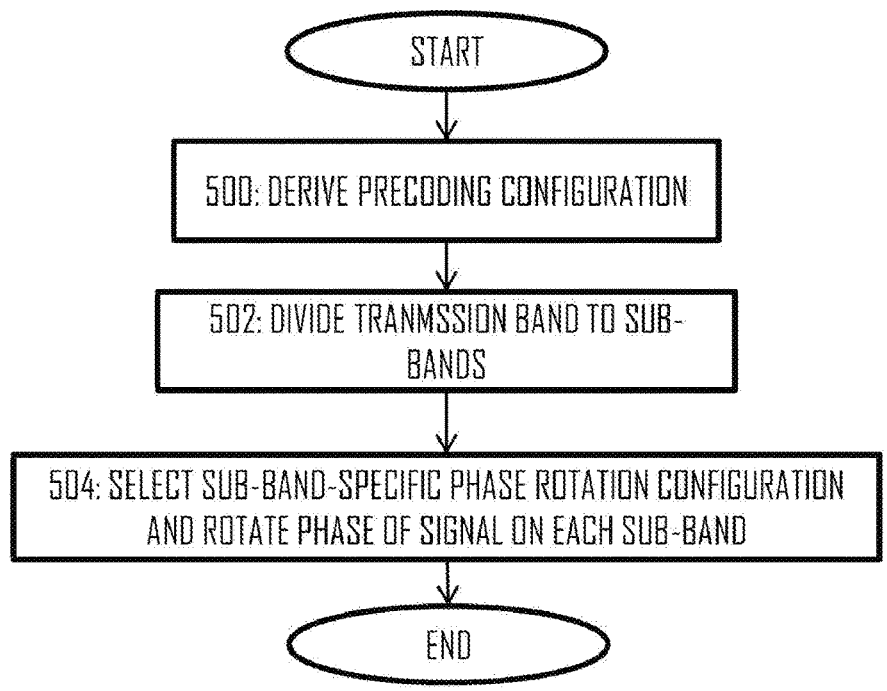
FIGS. 5 and 6 illustrate some embodiments for performing decorrelation across a plurality of sub-bands in a frequency domain.
Figure 6:
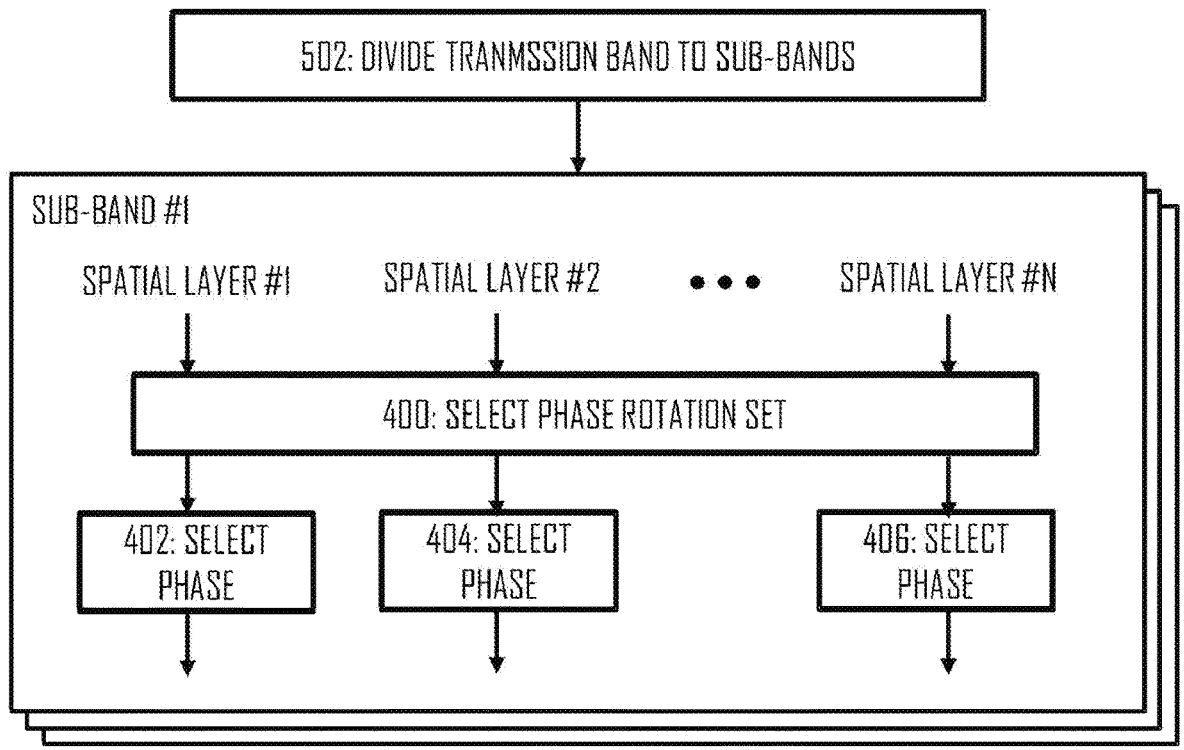

FIGS. 5 and 6 illustrate another embodiment of the invention. In this embodiment, the decorrelation is performed across a plurality of sub-bands. Referring to FIG. 5, let us describe a process of performing the decorrelation in this manner. In block 500, a precoding configuration such as the precoding matrix W is determined for the information to be transmitted. The precoding configuration may be determined on the basis of a precoding matrix indicator (PMI) received from the receiver such as the terminal device 122. The PMI may directly indicate the precoding configuration from a precoding configuration codebook, for example.

Thereafter, a transmission band allocated for transmission of said information may be divided into a plurality of sub-bands $B_0, B_1, \ldots, B_{T-1}$ (block 502) where T denotes the total number of sub-bands. The transmission band may refer to a frequency resource of a physical downlink shared channel (PDSCH), for example. The PDSCH may be referred to as a downlink channel that carries payload data. For each sub-band, a sub-band-specific phase rotation configuration may be selected in block 504, and the selected phase rotation configuration may be applied to all spatial layers on the same sub-band. The phase rotation configuration may define a different phase rotation value for at least two spatial layers of the same sub-band.

In an embodiment, the phase rotation configuration may comprise the phase rotation set described above.

In an embodiment, a different phase rotation configuration is selected for at least two different sub-bands.

FIG. 6 illustrates one example of the decorrelation in a greater detail. After block 502, signals on T sub-bands are generated. The signals may be frequency-domain signals, e.g. symbols associated with different sub-carriers of a multicarrier signal. Each sub-band may comprise a plurality of sub-carriers. Some systems employ a physical resource block (PRB) of a determined number of sub-carriers, e.g. 12 sub-carriers. Accordingly, the sub-band may comprise one PRB or a plurality of PRBs. For example, LTE defines precoding resource group (PRG) comprising a plurality of PRBs. In such an embodiment, a sub-band may comprise or consist of a PRG.

Referring to FIG. 6, after the division of the transmission band to the sub-bands 600, 602, 604, each sub-band 600 to 604 may be processed as described above in connection with FIG. 4. The number of sub-bands may be two or three (as illustrated in FIG. 6), but the number of sub-bands may be higher than that. In other words, the phase rotation configuration or the phase rotation set may be selected for each sub-band (block 400), and the phases of the selected phase rotation configuration/set may be applied to the spatial layers of the sub-band (blocks 402 to 406).

In an embodiment, a plurality of phase rotation matrices $R_0, R_1, \ldots, R_{P-1}$ may be defined, each being a diagonal matrix of size L×L, where L is the number of spatial layers. For a sub-band $B_i$, a phase rotation matrix $R_p$ may be selected from the plurality of phase rotation matrices. The selection may be arbitrary or even random in some embodiments. In an embodiment, p=mod(i|P). The selected phase rotation matrix may be considered as an embodiment of the phase rotation configuration. Now, assuming the selection of the precoding matrix W, the modified precoding matrix may be defined by:

$$W' = W \times R_p.$$

For rank L spatial multiplexing, the phase rotation matrix $R_p$ (0≤p≤P−1) can be denoted by:

$$R_p = \begin{bmatrix} e^{j\varphi_{p,1}} & 0 & \ldots & 0 \\ 0 & e^{j\varphi_{p,2}} & \ldots & 0 \\ \vdots & \vdots & \ddots & \vdots \\ 0 & 0 & \ldots & e^{j\varphi_{p,L}} \end{bmatrix}$$

where $\varphi_{p,1}, \varphi_{p,2}, \ldots, \varphi_{p,L}$ are the phase rotations on spatial layers 1 to L.

In the LTE, the demodulation reference signal may be assigned to the same resource elements (time-frequency elements) in antenna ports 7, 8, 11, and 13. Similarly, the demodulation reference signal may be assigned to the same resource elements (time-frequency elements) in antenna ports 9, 10, 12 and 14. For rank L transmission, the PDSCH is allocated to the first L ports in the port set {7, 8, 9, 10, 11, 12, 13, 14}. For example, for rank-3 transmission, PDSCH is allocated to port 7, port 8 and port 9; for rank-4 transmission, PDSCH is allocated to port 7, port 8, port 9 and port 10; and so on. Accordingly, the constructive superposition may occur because of the same demodulation reference signal in these antenna ports. Similar situation may occur in other systems. To minimize the correlation between the identical signals on the different spatial layers after the phase rotation, the phase rotation values may be selected so that the following orthogonality condition is satisfied:

$$\begin{bmatrix} e^{j\varphi_{0,l1}} \\ e^{j\varphi_{1,l1}} \\ \vdots \\ e^{j\varphi_{P-1,l1}} \end{bmatrix}^H \times \begin{bmatrix} e^{j\varphi_{0,l2}} \\ e^{j\varphi_{1,l2}} \\ \vdots \\ e^{j\varphi_{P-1,l2}} \end{bmatrix} = 0$$

where $[\bullet]^H$ represents a complex conjugate transpose operation, and {l1,l2} is a pair of spatial layers as listed below:
  Layer pair a: {1,3} corresponding to port 7 and port 9
  Layer pair b: {2,4} corresponding to port 8 and port 10
  Layer pair c: {5,6} corresponding to port 11 and port 12
  Layer pair d: {7,8} corresponding port 13 and port 14

For rank 3, the orthogonality condition for layer pair a should be satisfied. For rank 4 and rank 5, the orthogonality condition for both layer pair a and layer pair b should be satisfied. For rank 6 and rank 7, the orthogonality condition for layer pair a, layer pair b and layer pair c should be satisfied. For rank 8, the orthogonality condition for layer pair a, layer pair b, layer pair c and layer pair d should be satisfied.

Let us now describe some examples of the phase rotation configurations for the different numbers of spatial layers. The number of phase rotation matrices P=2 in this example, although the number of phase rotation matrices may be higher than two. Let us remind that the phase differences between the different branches realize the decorrelation and, hence, a fixed phase offset that is common to all spatial layers may be added to each rotation matrix or each spatial layer.

For L=3, the phase rotations matrices are:

$R_0$: $\varphi_{0,1}=0$, $\varphi_{0,2}=0$, $\varphi_{0,3}=0$;

$R_1$: $\varphi_{1,1}=0$, $\varphi_{1,2}=0$, $\varphi_{1,3}=\pi$.

For L=4 the phase rotation matrices are:

$R_0$: $\varphi_{0,1}=0$, $\varphi_{0,2}=0$, $\varphi_{0,3}=0$, $\varphi_{0,4}=0$;

$R_1$: $\varphi_{1,1}=0$, $\varphi_{1,2}=0$, $\varphi_{1,3}=\pi$, $\varphi_{1,4}=\pi$.

For L=5 the phase rotation matrices are:

$R_0$: $\varphi_{0,1}=0$, $\varphi_{0,2}=0$, $\varphi_{0,3}=0$, $\varphi_{0,4}=0$, $\varphi_{0,5}=0$;

$R_1$: $\varphi_{1,1}=0$, $\varphi_{1,2}=0$, $\varphi_{1,3}=\pi$, $\varphi_{1,4}=\pi$, $\varphi_{1,5}=0$.

For L=6 the phase rotation matrices are:

$R_0$: $\varphi_{0,1}=0$, $\varphi_{0,2}=0$, $\varphi_{0,3}=0$, $\varphi_{0,4}=0$, $\varphi_{0,5}=0$, $\varphi_{0,6}=0$;

$R_1$: $\varphi_{1,1}=0$, $\varphi_{1,2}=0$, $\varphi_{1,3}=\pi$, $\varphi_{1,4}=\pi$, $\varphi_{1,5}=0$, $\varphi_{1,6}=\pi$.

For L=7 the phase rotation matrices are:

$R_0$: $\varphi_{0,1}=0$, $\varphi_{0,2}=0$, $\varphi_{0,3}=0$, $\varphi_{0,4}=0$, $\varphi_{0,5}=0$, $\varphi_{0,6}=0$, $\varphi_{0,7}=0$;

$R_1$: $\varphi_{1,1}=0$, $\varphi_{1,2}=0$, $\varphi_{1,3}=\pi$, $\varphi_{1,4}=\pi$, $\varphi_{1,5}=0$, $\varphi_{1,6}=\pi$, $\varphi_{1,7}=0$.

For L=8 the phase rotation matrices are:

$R_0$: $\varphi_{0,1}=0$, $\varphi_{0,2}=0$, $\varphi_{0,3}=0$, $\varphi_{0,4}=0$, $\varphi_{0,5}=0$, $\varphi_{0,6}=0$, $\varphi_{0,7}=0$, $\varphi_{0,8}=0$;

$R_1$: $\varphi_{1,1}=0$, $\varphi_{1,2}=0$, $\varphi_{1,3}=\pi$, $\varphi_{1,4}=\pi$, $\varphi_{1,5}=0$, $\varphi_{1,6}=\pi$, $\varphi_{1,7}=0$, $\varphi_{1,8}=\pi$.

In another example of the implementation:
Number of phase rotation matrices: P=3
For L=3 the phase rotation matrices are:

$R_0$: $\varphi_{0,1}=0$, $\varphi_{0,2}=0$, $\varphi_{0,3}=0$;

$R_1$: $\varphi_{1,1}=2\pi/3$, $\varphi_{1,2}=0$, $\varphi_{1,3}=0$;

$R_2$: $\varphi_{2,1}=4\pi/3$, $\varphi_{2,2}=0$, $\varphi_{2,3}=0$.

For L=4 the phase rotation matrices are:

$R_0$: $\varphi_{0,1}=0$, $\varphi_{0,2}=0$, $\varphi_{0,3}=0$, $\varphi_{0,4}=4\pi/3$;

$R_1$: $\varphi_{1,1}=2\pi/3$, $\varphi_{1,2}=0$, $\varphi_{1,3}=0$, $\varphi_{1,4}=2\pi/3$;

$R_2$: $\varphi_{2,1}=4\pi/3$, $\varphi_{2,2}=0$, $\varphi_{2,3}=0$, $\varphi_{2,4}=0$.

For L=5 the phase rotation matrices are:

$R_0$: $\varphi_{0,1}=0$, $\varphi_{0,2}=0$, $\varphi_{0,3}=0$, $\varphi_{0,4}=4\pi/3$, $\varphi_{0,5}=0$;

$R_1$: $\varphi_{1,1}=2\pi/3$, $\varphi_{1,2}=0$, $\varphi_{1,3}=0$, $\varphi_{1,4}=2\pi/3$, $\varphi_{1,5}=0$;

$R_2$: $\varphi_{2,1}=4\pi/3$, $\varphi_{2,2}=0$, $\varphi_{2,3}=0$, $\varphi_{2,4}=0$, $\varphi_{2,5}=0$.

For L=6 the phase rotation matrices are:

$R_0$: $\varphi_{0,1}=0$, $\varphi_{0,2}=0$, $\varphi_{0,3}=0$, $\varphi_{0,4}=4\pi/3$, $\varphi_{0,5}=0$, $\varphi_{0,6}=0$;

$R_1$: $\varphi_{1,1}=2\pi/3$, $\varphi_{1,2}=0$, $\varphi_{1,3}=0$, $\varphi_{1,4}=2\pi/3$, $\varphi_{1,5}=0$, $\varphi_{1,6}=4\pi/3$;

$R_2$: $\varphi_{2,1}=4\pi/3$, $\varphi_{2,2}=0$, $\varphi_{2,3}=0$, $\varphi_{2,4}=0$, $\varphi_{2,5}=0$, $\varphi_{2,6}=2\pi/3$.

For L=7 the phase rotation matrices are:

$R_0$: $\varphi_{0,1}=0$, $\varphi_{0,2}=0$, $\varphi_{0,3}=0$, $\varphi_{0,4}=4\pi/3$, $\varphi_{0,5}=0$, $\varphi_{0,6}=0$, $\varphi_{0,7}=0$;

$R_1$: $\varphi_{1,1}=2\pi/3$, $\varphi_{1,2}=0$, $\varphi_{1,3}=0$, $\varphi_{1,4}=2\pi/3$, $\varphi_{1,5}=0$, $\varphi_{1,6}=4/\pi3$, $\varphi_{1,7}=0$.

$R_2$: $\varphi_{2,1}=4\pi/3$, $\varphi_{2,2}=0$, $\varphi_{2,3}=0$, $\varphi_{2,4}=0$, $\varphi_{2,5}=0$, $\varphi_{2,6}=2\pi/3$, $\varphi_{2,7}=0$.

For L=8 the phase rotation matrices are:

$R_0$: $\varphi_{0,1}=0$, $\varphi_{0,2}=0$, $\varphi_{0,3}=0$, $\varphi_{0,4}=4\pi/3$, $\varphi_{0,5}=0$, $\varphi_{0,6}=0$, $\varphi_{0,7}=0$, $\varphi_{0,8}=2\pi/3$;

$R_1$: $\varphi_{1,1}=2\pi/3$, $\varphi_{1,2}=0$, $\varphi_{1,3}=0$, $\varphi_{1,4}=2\pi/3$, $\varphi_{1,5}=0$, $\varphi_{1,6}=4\pi/3$, $\varphi_{1,7}=0$, $\varphi_{1,8}=0$;

$R_2$: $\varphi_{2,1}=4\pi/3$, $\varphi_{2,2}=0$, $\varphi_{2,3}=0$, $\varphi_{2,4}=0$, $\varphi_{2,5}=0$, $\varphi_{2,6}=2\pi/3$, $\varphi_{2,7}=0$, $\varphi_{2,8}=4\pi/3$.

Using these phase rotation configurations or other phase rotation configurations designed according to the above-described principles and conditions, the correlation between the signals allocated to the different spatial layers but to the same time-frequency resources may be avoided, thus reducing the PAPR. The correlation between the signals allocated to the different spatial layers and to different time-frequency resources of the same sub-band (e.g. different sub-carriers) may also be avoided, thus reducing the PAPR.

Additional advantages of the above-described embodiments include, for example, low complexity of decorrelation, and having no loss in the precoding gain.

Figure 7:
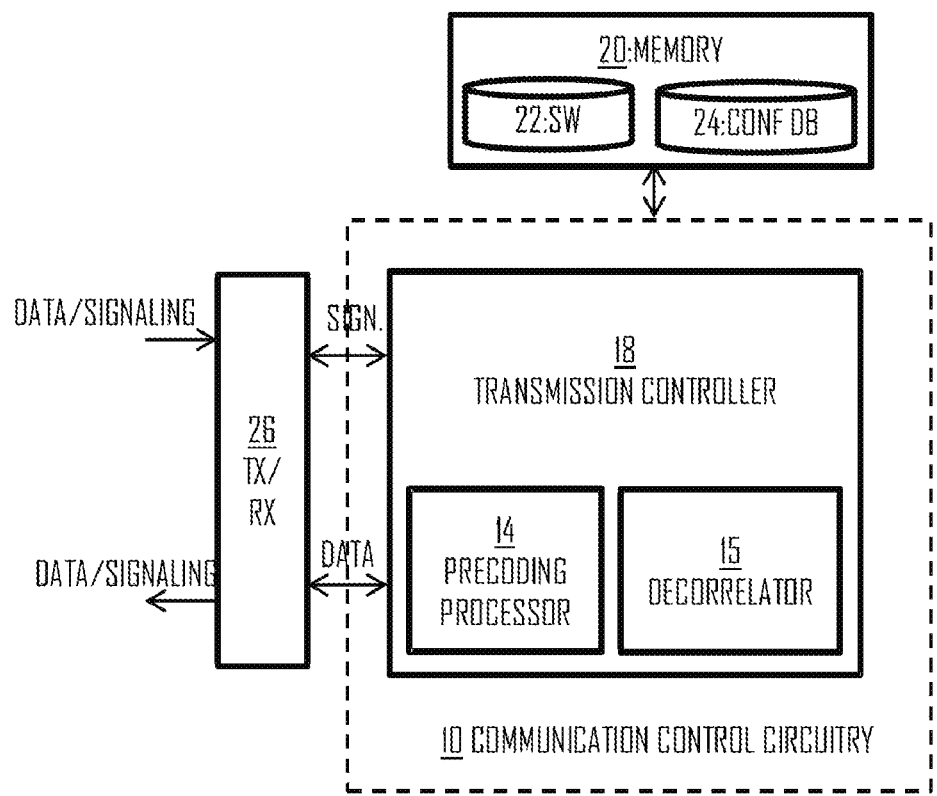
FIG. 7 illustrates a block diagram of a structure of an apparatus according to an embodiment of the invention.

FIG. 7 illustrates an apparatus configured to carry out the functions described above in connection with the transmitter or the access node 110. The apparatus may be an electronic device comprising electronic circuitries. The apparatus may comprise a communication control circuitry 10 such as at least one processor, and at least one memory 20 including a computer program code (software) 22 wherein the at least one memory and the computer program code (software) are configured, with the at least one processor, to cause the apparatus to carry out any one of the embodiments for performing the decorrelation for the information to be transmitted.

The memory 20 may be implemented using any suitable data storage technology, such as semiconductor based memory devices, flash memory, magnetic memory devices and systems, optical memory devices and systems, fixed memory and removable memory. The memory may comprise a configuration database 24 for storing configuration data for communicating in a cell over a radio interface. For example, the configuration database 24 may store a precoding matrix codebook defining a plurality of precoding configurations. Additionally, the configuration database may store a plurality of decorrelation configurations for carrying out the decorrelation. The phase rotation set and the phase rotation configuration may be considered as embodiments of the decorrelation configuration.

The apparatus may further comprise a communication interface (TX/RX) 26 comprising hardware and/or software for realizing communication connectivity according to one or more communication protocols. The communication interface may provide the apparatus with communication capabilities to communicate in a cellular communication system and enable communication with other access nodes and terminal devices, for example. The communication interface 26 may comprise standard well-known components such as an amplifier, filter, frequency-converter, (de)modulator, and encoder/decoder circuitries and one or more antennas. The communication interface 26 may comprise radio interface components providing the apparatus with radio communication capability in the cell. In other embodiments, the communication interface may provide the communication connectivity in another network, another communication link, and/or according to another communication protocol.

In an embodiment of FIG. 7, at least some of the functionalities of the access node may be shared between two physically separate devices, forming one operational entity. Therefore, the apparatus may be seen to depict the operational entity comprising one or more physically separate devices for executing at least some of the described processes. Thus, the apparatus of FIG. 7, utilizing such a shared architecture, may comprise a remote control unit (RCU), such as a host computer or a server computer, operatively coupled (e.g. via a wireless or wired network) to a remote radio head (RRH) located in a base station site. In an embodiment, at least some of the described processes of the access node may be performed by the RCU. In an embodiment, the execution of at least some of the described processes may be shared among the RRH and the RCU. In such a context, RCU may comprise the components illustrated in FIG. 7, and the communication interface 26 may provide the RCU with the connection to the RRH. The RRH may then comprise radio frequency signal processing circuitries and antennas, for example.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

The communication control circuitry 10 may comprise a transmission controller 18 configured to process the information to be transmitted according to the above-described procedures. The transmission controller may, for example, carry out the procedures described above in connection with blocks 300 to 308 of FIG. 3. The transmission controller 18 may additionally carry out some of the procedures of block 310, e.g. up to a digital-to-analogue conversion. The power amplifier, however, may be comprised in the communication interface 26. The transmission controller 18 may comprise, as a sub-circuitry, a precoding processor 14 and decorrelator module 15. The precoding processor may be configured to determine the precoding configuration in the above-described manner, e.g. on the basis of a precoding matrix indicator received from a terminal device. The precoding processor may thus carry out block 308 and block 500. The decorrelator 15 may be configured to carry out the decorrelation in block 306. In an embodiment, the decorrelator is configured to carry out the phase rotation according to any one of the embodiments described in connection with FIGS. 4 to 6. Accordingly, the decorrelator may perform blocks 400 to 406 (the embodiment of FIG. 4), blocks 502 and 504 (the embodiment of FIG. 5), or a combination of blocks 502, 504, and 400 to 406 (the embodiment of FIG. 6).

An embodiment of the invention comprises an apparatus comprising at least one processor, and at least one memory comprising a computer program code, wherein the processor, the memory, and the computer program code are configured to cause the apparatus to receive, from a transmitter, a communication signal comprising information in a plurality of spatial layers where the information has been arranged to the plurality of spatial layers in the transmitter such that each spatial layer is associated with a precoding configuration that is unique amongst the plurality of spatial layers, wherein the information comprises at least one signal that is identical in a plurality of the plurality of spatial layers and where a decorrelation operation has been performed in the transmitter across the plurality of spatial layers such that the at least one signal in one of the plurality of spatial layers becomes decorrelated with the at least one signal in another one of the plurality of spatial layers.

In an embodiment, the apparatus is the above-described receiver or comprised in the receiver, e.g. one or more circuitries or electronic devices in the receiver. In an embodiment, the receiver is a terminal device communicating with an access node.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 6 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 6 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 to 6 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method comprising:
arranging, in a transmitter, information to be transmitted to a receiver to a plurality of spatial layers where each spatial layer is associated with a unique precoding configuration amongst the plurality of spatial layers wherein the information comprises at least one signal that is identical in a plurality of the plurality of spatial layers;
performing, in the transmitter, a decorrelation operation across the plurality of spatial layers such that the at least one signal in one of the plurality of spatial layers becomes decorrelated with the at least one signal in another one of the plurality of spatial layers; and
causing, in the transmitter, transmission of a transmission signal comprising the information in the plurality of spatial layers to the receiver,
wherein said performing the decorrelation operation further comprises performing said decorrelation of the signal across a plurality of sub-bands, and
wherein said performing said decorrelation of the signal across the plurality of sub-bands comprises:
dividing a transmission band allocated for transmission of said information into said plurality of sub-bands;
selecting a sub-band-specific phase rotation configuration; and
applying the same phase rotation configuration to all spatial layers on the same sub-band, wherein the phase rotation configuration defines a different phase rotation value for at least two spatial layers of the same sub-band.

2. The method of claim 1, where said performing the decorrelation operation comprises:
selecting a phase rotation value for at least one of the plurality of spatial layers; and
rotating a phase of the at least one signal in said at least one of the plurality of spatial layers according to the selected phase rotation value.

3. The method of claim 2, further comprising maintaining at least one of the plurality of spatial layers without phase rotation.

4. The method of claim 2, further comprising rotating the phase of only one of the plurality of spatial layers.

5. The method of claim 2, further comprising selecting a different phase rotation value for different spatial layers.

6. The method of claim 1, wherein said unique precoding configuration is defined by a precoding vector associated with the spatial layer, said performing the decorrelation operation comprises:
multiplying each precoding vector with a unique phase rotating vector amongst a plurality of phase rotating vectors, wherein said plurality of phase rotating vectors are selected such that the following equation is satisfied:

$$\frac{w'_1}{w'_2} = -\frac{w'_3}{w'_4}$$

where:
$w'_1$ is a first precoding vector associated with a first one of the plurality of spatial layers, multiplied by a first phase rotating vector,
$w'_2$ is a second precoding vector associated with a second one of the plurality of spatial layers, multiplied by a second phase rotating vector, and w'₃ is a third precoding vector associated with a third one of the plurality of spatial layers, multiplied by a third phase rotating vector, and w'₄ is a fourth precoding vector associated with a fourth one of the plurality of spatial layers, multiplied by a fourth phase rotating vector.

7. The method of claim 1, wherein said unique pre-coding configuration is defined by a precoding vector associated with the spatial layer, said performing the decorrelation operation comprises:

multiplying each precoding vector with a unique phase rotating vector amongst a plurality of phase rotating vectors, wherein said plurality of phase rotating vectors are selected such that the following equations are satisfied:

$$\frac{w'_1}{w'_2} = -\frac{w'_3}{w'_4}, \frac{w'_5}{w'_7} = -\frac{w'_6}{w'_8}$$

where:

w'₁ is a first precoding vector associated with a first one of the plurality of spatial layers, multiplied by a first phase rotating vector, w'₂ is a second precoding vector associated with a second one of the plurality of spatial layers, multiplied by a second phase rotating vector, w'₃ is a third precoding vector associated with a third one of the plurality of spatial layers, multiplied by a third phase rotating vector, w'₄ is a fourth precoding vector associated with a fourth one of the plurality of spatial layers, multiplied by a fourth phase rotating vector, w'₅ is a fifth precoding vector associated with a fifth one of the plurality of spatial layers, multiplied by a fifth rotating vector, w'₆ is a sixth precoding vector associated with a sixth one of the plurality of spatial layers, multiplied by a sixth phase rotating vector, w'₇ is a seventh precoding vector associated with a seventh one of the plurality of spatial layers, multiplied by a seventh phase rotating vector, and w'₈ is a eighth precoding vector associated with an eighth one of the plurality of spatial layers, multiplied by an eighth phase rotating vector.

8. The method of claim 1, further comprising configuring the phase rotation configuration to comprise phase rotation values selected such that the following orthogonality condition is satisfied:

$$\begin{bmatrix} e^{j\varphi_{0,l1}} \\ e^{j\varphi_{1,l1}} \\ \vdots \\ e^{j\varphi_{P-1,l1}} \end{bmatrix}^H \times \begin{bmatrix} e^{j\varphi_{0,l2}} \\ e^{j\varphi_{1,l2}} \\ \vdots \\ e^{j\varphi_{P-1,l2}} \end{bmatrix} = 0$$

where $e^{j\varphi_{0,l1}}$ to $e^{j\varphi_{P-1,l1}}$ to define phase rotation values for a first spatial layer $l_1$, and $e^{j\varphi_{0,l2}}$ to $e^{j\varphi_{P-1,l2}}$ define phase rotation values for a second spatial layer $l_2$.

9. The method of claim 1, further comprising selecting different phase rotation configurations for different sub-bands.

10. The method of claim 1, wherein the at least one signal that is identical in the plurality of the plurality of spatial layers comprises a terminal-device-specific signal.

11. The method of claim 1, wherein the at least one signal that is identical in the plurality of the plurality of spatial layers comprises a reference signal.

12. The method of claim 1, wherein said precoding configuration defines a transmission beamforming configuration for a spatial layer.

13. An apparatus comprising:

at least one processor, and at least one memory comprising a computer program code, wherein the at least one processor, the at least one memory, and the computer program code are configured to cause the apparatus to:

arrange information to be transmitted to a receiver to a plurality of spatial layers where each spatial layer is associated with a unique precoding configuration amongst the plurality of spatial layers, wherein the information comprises at least one signal that is identical in a plurality of the plurality of spatial layers;

perform a decorrelation operation across the plurality of spatial layers such that the at least one signal in one of the plurality of spatial layers becomes decorrelated with the at least one signal in another one of the plurality of spatial layers; and cause transmission of a transmission signal comprising the information in the plurality of spatial layers to the receiver, wherein perform the decorrelation operation further comprises perform said decorrelation of the signal across a plurality of sub-bands, and wherein perform said decorrelation of the signal across the plurality of sub-bands comprises:

divide a transmission band allocated for transmission of said information into said plurality of sub-bands;

select a sub-band-specific phase rotation configuration; and apply the same phase rotation configuration to all spatial layers on the same sub-band, wherein the phase rotation configuration defines a different phase rotation value for at least two spatial layers of the same sub-band.

14. The apparatus of claim 13, wherein the at least one processor, the at least one memory, and the computer program code are configured to cause the apparatus to carry out at least the following when performing the decorrelation operation:

select a phase rotation value for at least one of the plurality of spatial layers; and rotate a phase of the at least one signal in said at least one of the plurality of spatial layers according to the selected phase rotation value.

15. The apparatus of claim 14, wherein the at least one processor, the at least one memory, and the computer program code are configured to cause the apparatus to maintain at least one of the plurality of spatial layers without phase rotation.

16. The apparatus of claim 14, wherein the at least one processor, the at least one memory, and the computer program code are configured to cause the apparatus to rotate the phase of only one of the plurality of spatial layers.

17. The apparatus of claim 14, wherein the at least one processor, the at least one memory, and the computer program code are configured to cause the apparatus to select a different phase rotation value for different spatial layers.

18. A non-transitory program storage device readable by an apparatus, tangibly embodying a program of instructions executable by the apparatus for performing operations, the operations comprising:

arranging, in the apparatus, information to be transmitted to a receiver to a plurality of spatial layers where each spatial layer is associated with a unique precoding configuration amongst the plurality of spatial layers wherein the information comprises at least one signal that is identical in a plurality of the plurality of spatial layers;

performing, in the apparatus, a decorrelation operation across the plurality of spatial layers such that the at least one signal in one of the plurality of spatial layers becomes decorrelated with the at least one signal in another one of the plurality of spatial layers; and causing, in the apparatus, transmission of a transmission signal comprising the information in the plurality of spatial layers to the receiver, wherein said performing the decorrelation operation further comprises performing said decorrelation of the signal across a plurality of sub-bands, and wherein said performing said decorrelation of the signal across the plurality of sub-bands comprises:
dividing a transmission band allocated for transmission of said information into said plurality of sub-bands;
selecting a sub-band-specific phase rotation configuration; and applying the same phase rotation configuration to all spatial layers on the same sub-band, wherein the phase rotation configuration defines a different phase rotation value for at least two spatial layers of the same sub-band.

* * * * *